(12) United States Patent
Fujiwara et al.

(10) Patent No.: US 12,491,870 B2
(45) Date of Patent: Dec. 9, 2025

(54) CONTROL DEVICE, CONTROL METHOD, AND STORAGE MEDIUM

(71) Applicant: HONDA MOTOR CO., LTD., Tokyo (JP)

(72) Inventors: Tatsuro Fujiwara, Tokyo (JP); Masafumi Sagara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 18/237,230

(22) Filed: Aug. 23, 2023

(65) Prior Publication Data

US 2024/0067166 A1 Feb. 29, 2024

(30) Foreign Application Priority Data

Aug. 31, 2022 (JP) .................................. 2022-137858

(51) Int. Cl.
*B60W 30/09* (2012.01)
*B60W 50/14* (2020.01)

(52) U.S. Cl.
CPC ............ *B60W 30/09* (2013.01); *B60W 50/14* (2013.01); *B60W 2050/146* (2013.01); *B60W 2554/80* (2020.02)

(58) Field of Classification Search
CPC .. B60W 30/09; B60W 50/14; B60W 2554/80; B60W 2050/146
See application file for complete search history.

(56) References Cited

U.S. PATENT DOCUMENTS

2017/0025005 A1* 1/2017 Barth ..................... G08G 1/166

FOREIGN PATENT DOCUMENTS

JP 2005-045602 A 2/2005

* cited by examiner

*Primary Examiner* — Michael D Lang
(74) *Attorney, Agent, or Firm* — Paratus Law Group, PLLC

(57) ABSTRACT

A control device includes: an external environment recognition unit configured to acquire an external environment recognition image showing a recognition result of surroundings of a moving body; and a display control unit configured to display the external environment recognition image on a display device. The display control unit is configured to superimpose and display a stop guide indicating a position where movement of the moving body needs to be stopped on the external environment recognition image on the display device, and, when the stop guide is superimposed on the external environment recognition image, the display control unit makes a display mode of the stop guide different according to whether a specific portion of the moving body included in the external environment recognition image and the stop guide overlap with each other.

9 Claims, 6 Drawing Sheets

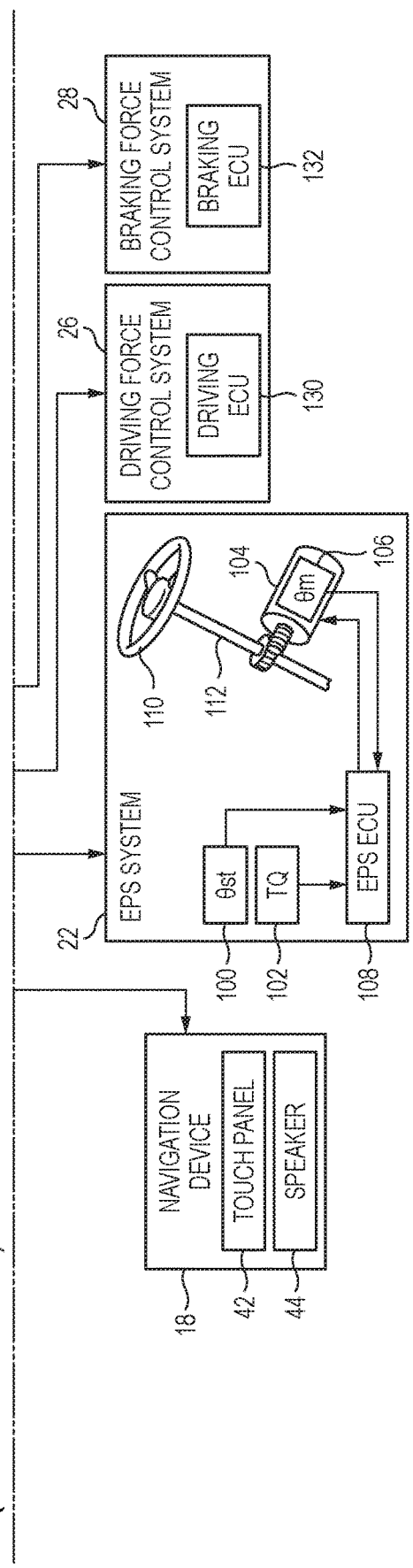

CONTROL DEVICE, CONTROL METHOD, AND STORAGE MEDIUM

CROSS-REFERENCE RELATED ARTS

This application is based on and claims priority under 35 USC 119 from Japanese Patent Application No. 2022-137858 filed on Aug. 31, 2022.

TECHNICAL FIELD

The present invention relates to a control device, a control method, and a storage medium.

BACKGROUND ART

In recent years, efforts have been actively made to provide access to a sustainable transportation system in consideration of vulnerable people among traffic participants. In order to implement the above, focus has been placed on research and development on further improving safety and convenience of traffic by research and development related to driving assistance technique.

In the related art, it is known that during vehicle movement, for example during parking, a vehicle surrounding image captured by an in-vehicle camera or the like is displayed on a display device of the vehicle. Further, it is known that as the vehicle approaches a surrounding vehicle or an obstacle, stop guides are displayed in a superimposed manner on the vehicle surrounding image. JP2005-45602 A discloses that, on a display screen of a vehicular visual field monitoring system, detection information detected by an obstacle detection sensor and information on a movement prediction trajectory range in which a vehicle travels corresponding to a steering angle of the vehicle are converted into display symbols that stand in a perpendicular direction from a road surface, and the converted display symbols are displayed in a superimposed manner in a vehicle surrounding image.

SUMMARY

For example, a front camera provided on a vehicle front side and a rear camera provided on a vehicle rear side are often different in attachment positions, attachment angles, angle of views, and the like. Therefore, for example, a bumper of the host vehicle does not appear in a surrounding image captured by the front camera, and a driver cannot easily grasp the distance from the obstacle and may feel uneasy while a bumper (specific portion) of the host vehicle appears in a surrounding image captured by the rear camera, and the driver can easily grasp a distance from an obstacle depending on a relationship between the bumper of the host vehicle in the surrounding image and the stop guides.

On the contrary, it is considered to change an attachment position, an attachment angle, an angle of view, and the like of the front camera, so that the bumper of the host vehicle also appears in the surrounding image captured by the front camera. In such a case, when the host vehicle most closely approaches the obstacle, the stop guides and the bumper of the host vehicle may overlap with each other in the surrounding image. In this case, since the stop guides are superimposed such that the stop guides can be seen on a nearer side of the surrounding image from the driver's point of view, it looks like the stop guides are on the nearer side of the bumper of the host vehicle, and it may be difficult to grasp the distance to the obstacle.

As discussed above, while it has been proposed that the stop guides indicating a position where the moving body needs to be stopped are displayed in a superimposed manner in the surrounding image in the driving assistance technique, there is room for further improvement for a desirable display mode.

An object of the present invention is to provide a control device, a control method, and a storage medium storing a control program for easily grasping a distance to a position where a moving body needs to be stopped, which contributes to development of a sustainable transportation system accordingly.

According to an aspect of the present disclosure, there is provided a control device including:

an external environment recognition unit configured to acquire an external environment recognition image showing a recognition result of surroundings of a moving body; and a display control unit configured to display the external environment recognition image on a display device, in which the display control unit is configured to superimpose and display a stop guide indicating a position where movement of the moving body needs to be stopped on the external environment recognition image on the display device, and, when the stop guide is superimposed on the external environment recognition image, the display control unit makes a display mode of the stop guide different according to whether a specific portion of the moving body included in the external environment recognition image and the stop guide overlap with each other.

According to another aspect of the present disclosure, there is provided a control method by a control device including an external environment recognition unit configured to acquire an external environment recognition image showing a recognition result of surroundings of a moving body and configured to display the external environment recognition image on a display device, the control method including:

superimposing and displaying a stop guide showing a position where movement of the moving body needs to be stopped on the external environment recognition image on the display device; and making a display mode of the stop guide different according to whether a specific portion of the moving body included in the external environment recognition image and the stop guide overlap with each other when the stop guide is superimposed on the external environment recognition image.

According to another aspect of the present disclosure, there is provided a non-transitory computer readable storage medium storing a control program for causing a processor of a control device including an external environment recognition unit configured to acquire an external environment recognition image showing a recognition result of surroundings of a moving body and configured to display the external environment recognition image on a display device to execute a process including:

superimposing and displaying a stop guide indicating a position where movement of the moving body needs to be stopped on the external environment recognition image on the display device, and making a display mode of the stop guide different according to whether a specific portion of the moving body included in the external environment recognition image and the stop guide overlap with each other when the stop guide is superimposed on the external environment recognition image.

According to the present disclosure, it is possible to provide a control device, a control method, and a storage medium storing a control program for easily grasping a distance from a position where a moving body needs to be stopped.

BRIEF DESCRIPTION OF DRAWINGS

Exemplary embodiment(s) of the present invention will be described in detail based on the following figures, wherein.

DESCRIPTION OF EMBODIMENTS

Figure 1:
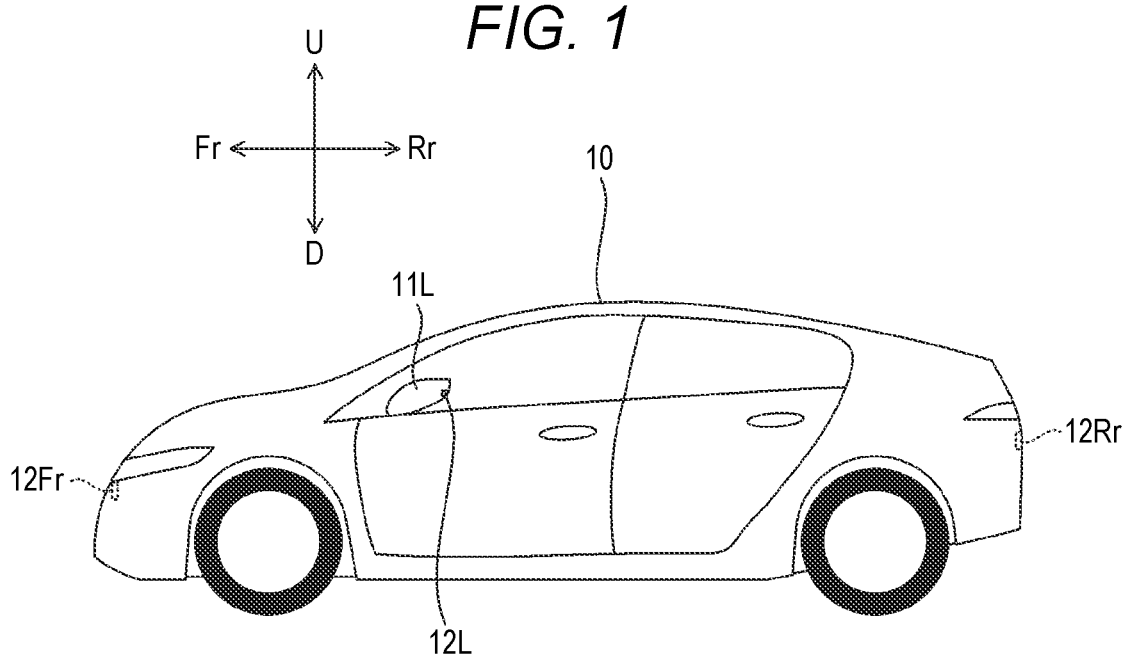
FIG. 1 is a side view of a vehicle 10 of which movement is controlled by a control device of the present invention.

Hereinafter, an embodiment of a control device, a control method, and a control program of the present disclosure will be described with reference to the accompanying drawings. The drawings are viewed from directions of reference numerals. Further, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D. Vehicle 10 to be moved and controlled by control device of present disclosure.

Figure 2:
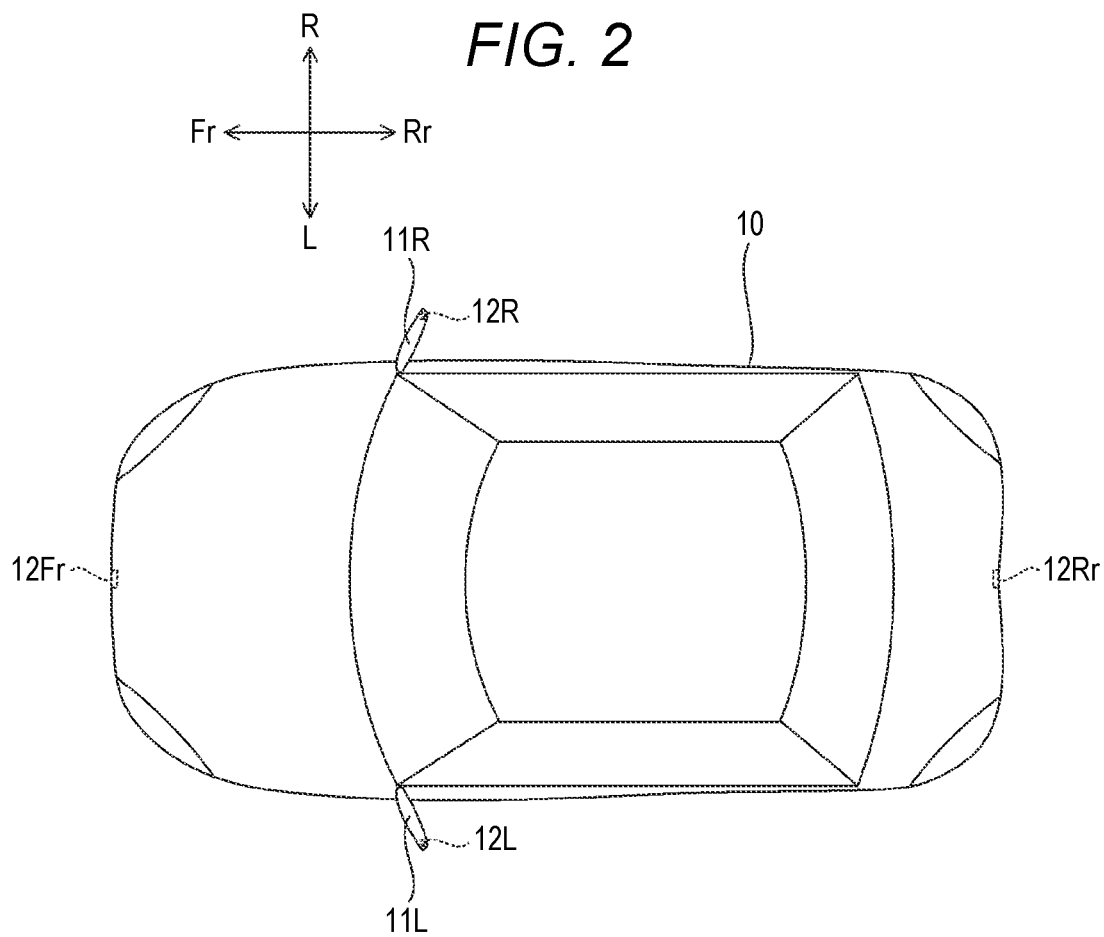
FIG. 2 is a top view of the vehicle 10 shown in FIG. 1.

FIG. 1 is a side view of the vehicle 10 of which movement is controlled by the control device of the present disclosure. FIG. 2 is a top view of the vehicle 10 shown in FIG. 1. The vehicle 10 is an example of a moving body of the present disclosure.

The vehicle 10 is an automobile including a drive source (not shown) and wheels including driven wheels driven by power of the drive source and steerable driven wheels. In the present embodiment, the vehicle 10 is a four-wheeled automobile including a pair of left and right front wheels and a pair of left and right rear wheels. The drive source of the vehicle is, for example, an electric motor. The drive source of the vehicle 10 may be an internal combustion engine such as a gasoline engine or a diesel engine, or a combination of the electric motor and the internal combustion engine. Further, the drive source of the vehicle 10 may drive the pair of left and right front wheels, the pair of left and right rear wheels, or the four wheels including the pair of left and right front wheels and the pair of left and right rear wheels. Both the front wheels and the rear wheels may be the steerable driven wheels, or any one of the front wheels and the rear wheels may be the steerable driven wheels.

The vehicle 10 further includes side mirrors 11L and 11R. The side mirrors 11L and 11R are mirrors (rear-view mirrors) that are provided on outer sides of front seat doors of the vehicle 10 and that are for a driver to check a rear side and rear lateral sides. Each of the side mirrors 11L and 11R is fixed to a main body of the vehicle 10 by a rotation shaft that extends in a perpendicular direction, and can be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and that images the front side of the vehicle 10. The rear camera 12Rr is a digital camera that is provided at a rear portion of the vehicle 10 and that images the rear side of the vehicle 10. The left side camera 12L is a digital camera that is provided at a left side mirror 11L of the vehicle 10 and that images the left side of the vehicle 10. The right side camera 12R is a digital camera that is provided at a right side mirror 11R of the vehicle 10 and that images the right side of the vehicle 10.

(Internal Configuration of Vehicle 10)

Figure 3:
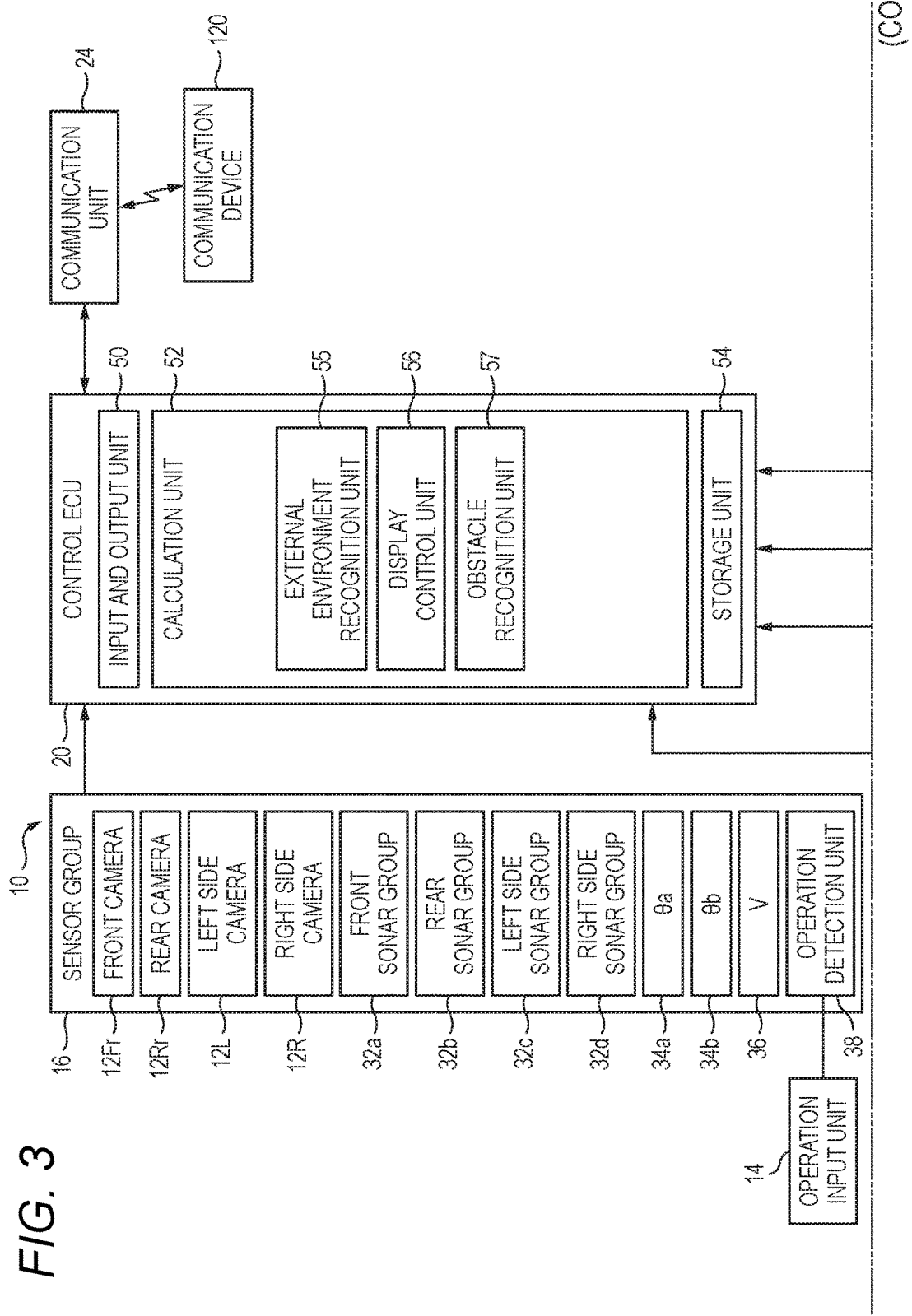
FIG. 3 is a block diagram showing an example of an internal configuration of the vehicle 10 shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38. The sensor group 16 may include a radar.

The front camera 12Fr, the rear camera 12Rr, the left side camera 12L, and the right side camera 12R acquire recognition data (for example, an external environment recognition image) for recognizing surroundings of the vehicle 10 by imaging the surroundings of the vehicle 10. An external environment recognition image captured by the front camera 12Fr is referred to as a front side recognition image. An external environment recognition image captured by the rear camera 12Rr is referred to as a rear side recognition image. An external environment recognition image captured by the left side camera 12L is referred to as a left side recognition image. An external environment recognition image captured by the right side camera 12R is referred to as a right side recognition image. An image constituted by the left side recognition image and the right side recognition image may be referred to as a side recognition image. An external environment recognition image generated by combining imaging data of the front camera 12Fr, the rear camera 12Rr, the left side camera 12L, and the right side camera 12R may be referred to as a top view image of the vehicle 10.

The front sonar group 32a, the rear sonar group 32b, the left side sonar group 32c, and the right side sonar group 32d emit sound waves to the surroundings of the vehicle 10, and receive reflected sounds from other objects. The front sonar group 32a includes, for example, four sonars. The sonars that constitute the front sonar group 32a are provided on an obliquely left front side, a front left side, a front right side, and an obliquely right front side of the vehicle 10, respectively. The rear sonar group 32b includes, for example, four sonars. The sonars that constitute the rear sonar group 32b are provided on an obliquely left rear side, a rear left side, a rear right side, and an obliquely right rear side of the vehicle 10, respectively. The left side sonar group 32c includes, for example, two sonars. The sonars that constitute the left side sonar group 32c are provided at a left side front portion and a left side rear portion of the vehicle 10, respectively. The right side sonar group 32d includes, for example, two sonars. The sonars that constitute the right side sonar group 32d are provided at a right side front portion and a right side rear portion of the vehicle 10, respectively.

The wheel sensors 34a and 34b detect rotation angles of the wheels of the vehicle 10. The wheel sensors 34a and 34b may be implemented by angle sensors, or may be implemented by displacement sensors. The wheel sensors 34a and 34b output detection pulses every time the wheels are rotated by a predetermined angle. The detection pulses output from the wheel sensors 34a and 34b are used for calculating rotation angles of the wheels and rotation speeds of the wheels. A movement distance of the vehicle 10 is calculated based on the rotation angles of the wheels. The wheel sensor 34a detects, for example, a rotation angle θa of the left rear wheel. The wheel sensor 34b detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects an operation content of a user performed using the operation input unit 14, and outputs the detected operation content to the control ECU 20. The operation input unit 14 includes various user interfaces such as a side mirror switch that switches between open and closed states of the side mirrors 11L and 11R, and a shift lever (a selector lever or a selector).

The navigation device 18 detects a current position of the vehicle 10 by using, for example, a global positioning system (GPS), and guides the user to a path to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various kinds of guidance information to the user of the vehicle 10 by a sound.

The touch panel 42 is configured such that various commands for the control ECU 20 are input via the touch panel 42. For example, a command to display an external environment recognition image of the vehicle 10 can be input by the user via the touch panel 42. Further, the touch panel 42 is configured to display various screens related to control content of the control ECU 20. For example, the external environment recognition image of the vehicle 10 is displayed on the touch panel 42. A constituent element other than the touch panel 42, for example, a head-up display (HUD), a smartphone, or a tablet terminal may be used as an input device or a display device.

The control ECU 20 includes an input and output unit 50, a calculation unit 52, and a storage unit 54. The calculation unit 52 is implemented by, for example, a central processing unit (CPU). The calculation unit 52 performs various kinds of control by controlling units based on a program stored in the storage unit 54. Further, the calculation unit 52 inputs and outputs a signal from and to each unit connected to the control ECU 20 via the input and output unit 50.

The calculation unit 52 includes an external environment recognition unit 55 that recognizes the external environment recognition image, a display control unit 56 that displays and controls the external environment recognition image, and an obstacle recognition unit 57 that recognizes an obstacle around the vehicle 10. The calculation unit 52 is an example of the control device of the present disclosure.

The external environment recognition unit 55 acquires the external environment recognition images indicating recognition results of surrounding images of the vehicle 10 captured by the front camera 12Fr, the rear camera 12Rr, the left side camera 12L, and the right side camera 12R from the cameras.

The display control unit 56 displays the external environment recognition image acquired by the external environment recognition unit 55 on the display device of the vehicle 10. Specifically, the display control unit 56 displays, on the touch panel 42, the front side recognition image captured by the front camera 12Fr, the rear side recognition image captured by the rear camera 12Rr, the left side recognition image captured by the left side camera 12L, and the right side recognition image captured by the right side camera 12R. Further, the display control unit 56 displays, on the touch panel 42, the top view image of the vehicle 10 generated by combining imaging data of the front camera 12Fr, the rear camera 12Rr, the left side camera 12L, and the right side camera 12R.

The display control unit 56 superimposes stop guides indicating a position where movement of the vehicle 10 needs to be stopped on the external environment recognition image, and displays them on the touch panel 42. The stop guide is, for example, a guide indicating that the vehicle 10 needs to be stopped, that is, a guide warning that the vehicle 10 approaches an obstacle, and is displayed, for example, like a longitudinal signboard. The stop guide has transparency.

When the stop guides are superimposed on the external environment recognition image, the display control unit 56 makes a display mode of the stop guides different according to whether a specific portion of the vehicle 10 included in the external environment recognition image and the stop guides overlap with each other. The specific portion of the vehicle 10 is, for example, a bumper of the vehicle 10. Specifically, when the bumper of the vehicle 10 included in the external environment recognition image and the stop guides overlap with each other, the display control unit 56 makes the display mode of the stop guides different between in regions of the stop guides overlapping with the bumper of the vehicle 10 and in other regions of the stop guides.

For example, when the bumper of the vehicle 10 included in the external environment recognition image and the stop guides overlap with each other, the display control unit 56 hides the regions of the stop guides overlapping with the bumper of the vehicle 10. Accordingly, the bumper of the vehicle 10 is displayed in the region, and from the driver's point of view, it looks like the stop guides are on a further side of the bumper of the vehicle 10.

Alternatively, when the bumper of the vehicle 10 included in the external environment recognition image and the stop guides overlap with each other, the display control unit 56 may make transmittance of the regions of the stop guides overlapping with the bumper of the vehicle 10 higher than transmittance of other regions of the stop guides. Accordingly, it is difficult to visually recognize the stop guides in the region, and from the driver's point of view, it looks like the stop guides are on the further side of the bumper of the vehicle 10. As an example, the display control unit 56 sets the transmittance of the regions of the stop guides not overlapping with the bumper of the vehicle 10 to about 50%, and sets the transmittance of the regions of the stop guides overlapping with the bumper of the vehicle 10 to about 90%. The transmittance of the regions of the stop guides overlapping with the bumper of the vehicle 10 in this case may be selectable by an operation from the user.

For example, when a distance between an obstacle detected around the vehicle 10 and the vehicle 10 is close to a predetermined distance or less, the display control unit 56 displays the stop guides in a superimposed manner on the external environment recognition image.

The obstacle recognition unit 57 recognizes an obstacle present around the vehicle 10. For example, the obstacle recognition unit 57 recognizes whether an obstacle is present around a parking position that is a target of the vehicle 10 when parking the vehicle 10, or whether an obstacle is present around a current parking position of the vehicle 10 when the vehicle 10 leaves a parking lot. Examples of the obstacle include an article that hinders traveling of the vehicle 10, for example, a wall, a pillar, another vehicle, and a person. The obstacle recognition unit 57 includes, for example, the sonar groups 32a to 32d, the cameras 12Fr, 12Rr, 12L, and 12R, and a LiDAR.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby enabling the occupant to perform operation assistance of the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 can perform wireless communication with another communication device 120. The other communication device 120 includes a base station, a communication device of another vehicle, a smartphone or a tablet terminal carried by the user of the vehicle 10, and the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

(Processing Performed by Calculation Unit 52)

Figure 4:
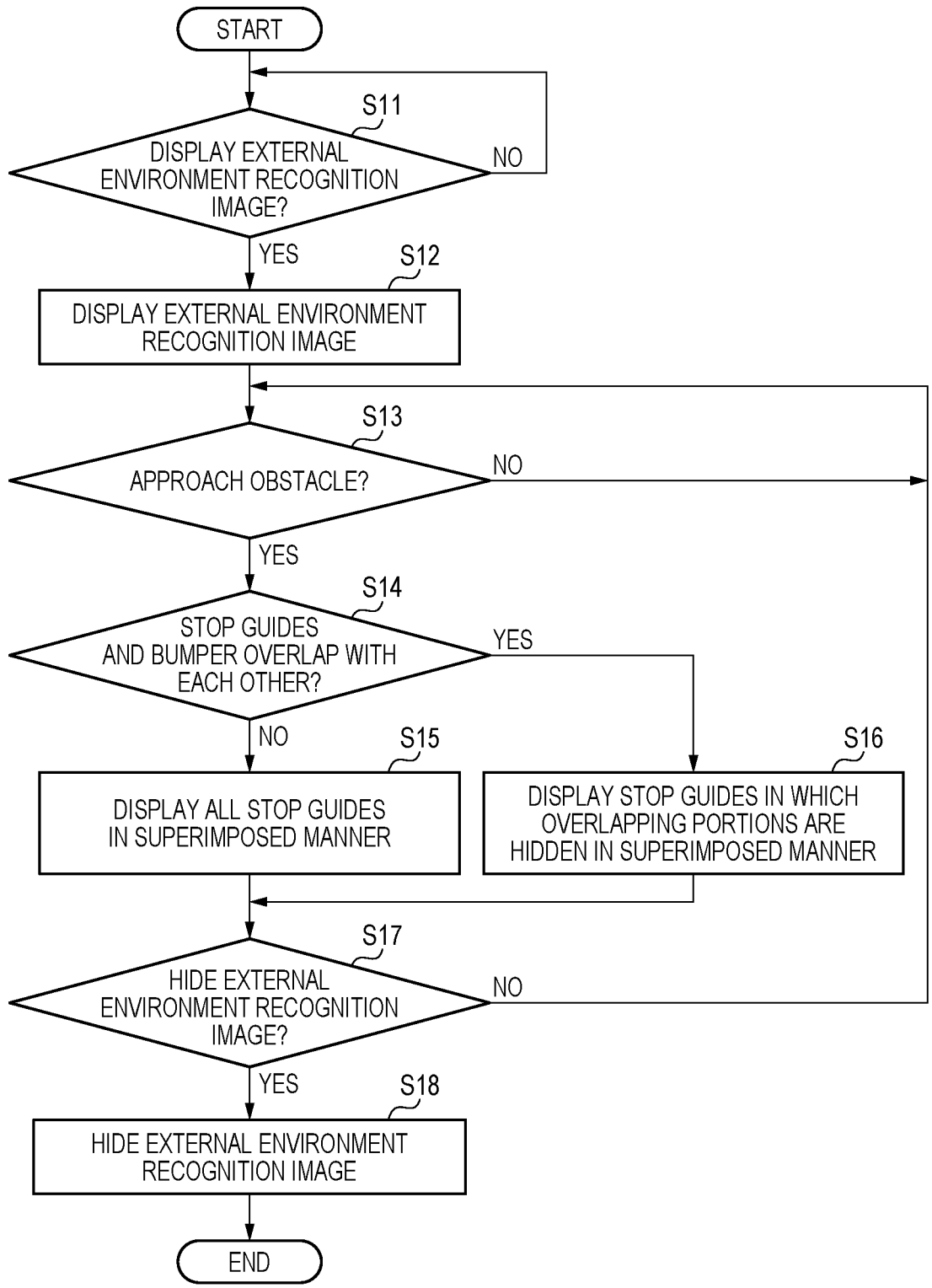
FIG. 4 is a flowchart showing an example of processing performed by a calculation unit 52.

Next, an example of display of the stop guides performed by the calculation unit 52 of the vehicle 10 will be described with reference to a flowchart shown in FIG. 4.

For example, the user who drives the vehicle 10 attempts to park the vehicle 10 in a parking space at a parking lot. It is assumed that the vehicle 10 is in, for example, a low-speed traveling (for example, 15 km/h or less) state or a stopped state. For example, when a traveling state of the vehicle 10 is detected based on a detection value of the vehicle speed sensor 36, the calculation unit 52 of the vehicle 10 starts the processing shown in FIG. 4.

The display control unit 56 of the calculation unit 52 determines whether the external environment recognition image acquired by the external environment recognition unit 55 is to be displayed on the touch panel 42 of the navigation device 18 (step S11). The external environment recognition image is displayed, for example, when a parking button (not shown) displayed on the touch panel 42 is tapped. Therefore, the display control unit 56 determines, for example, whether the parking button is tapped by the user.

When the external environment recognition image is not displayed on the touch panel 42, that is, when the parking button is not tapped in step S11 (step S11: No), the display control unit 56 repeats the processing in step S11 until the parking button is tapped, and waits.

When the external environment recognition image is displayed on the touch panel 42, that is, when the parking button is tapped in step S11 (step S11: Yes), the display control unit 56 displays the external environment recognition image on the touch panel 42 (step S12). For example, when a gear of the vehicle 10 is set to reverse, the display control unit 56 displays the rear side recognition image captured by the rear camera 12Rr on the touch panel 42. Further, for example, when the gear of the vehicle 10 is set to drive, neutral, parking, or the like, the display control unit 56 displays the front side recognition image captured by the front camera 12Fr on the touch panel 42.

Next, the display control unit 56 determines whether the vehicle 10 is close to an obstacle (step S13). As described above, the obstacle around the vehicle 10 is recognized by the obstacle recognition unit 57. Being close to the obstacle means a state, for example, where a distance between a front end or a rear end of the vehicle 10 and the obstacle around the vehicle 10 is 1 m or less.

When the vehicle 10 is not close to the obstacle in step S13 (step S13: No), the display control unit 56 repeats the processing in step S13 until the vehicle 10 is close to the obstacle, without superimposing the stop guides on the external environment recognition image, and waits.

When the vehicle 10 is close to the obstacle in step S13 (step S13: Yes), the display control unit 56 determines whether the stop guides and the bumper of the external environment recognition image overlap with each other when the stop guides are superimposed on the external environment recognition image (step S14). Specifically, the display control unit 56 performs the determination in step S14 based on a region of the external environment recognition image where the bumper of the vehicle 10 appears, and a display region of the stop guides calculated based on the distance between the vehicle 10 and the obstacle or the like.

The region of the external environment recognition image where the bumper of the vehicle 10 appears is preset, for example, in the control ECU 20. The region may be set for each method for generating the external environment recognition image. The method for generating the external environment recognition image means a camera used for imaging (the front camera 12Fr or the rear camera 12Rr), setting of the camera (an imaging direction, an angle of view, and the like), and the like. Alternatively, the region of the external environment recognition image where the bumper of the vehicle 10 appears may be acquired by the display control unit 56 recognizing the region where the bumper appears by image recognition of the external environment recognition image.

When the stop guides and the bumper do not overlap with each other in step S14 (step S14: No), the display control unit 56 superimposes all the stop guides generated based on the distance between the vehicle 10 and the obstacle or the like on the external environment recognition image, and displays them on the touch panel 42 (step S15), and shifts to step S17.

When the stop guides and the bumper overlap with each other in step S14 (step S14: Yes), the display control unit 56 superimposes the stop guides that are generated based on the distance between the vehicle 10 and the obstacle or the like, on the external environment recognition image, with the portions overlapping the bumper in the external environment recognition image being hidden, displays them on the touch panel 42 (step S16), and shifts to step S17.

In step S15 or step S16, the stop guides are in a state of being displayed in a superimposed manner on the external environment recognition image, and the user may park the vehicle 10 in the target parking space while referring to the stop guides.

After the stop guides are superimposed and displayed in step S15 or step S16, the display control unit 56 determines whether to hide the external environment recognition image displayed on the touch panel 42 (step S17). The external environment recognition image is hidden, for example, when an end button (not shown) displayed on the touch panel 42 is tapped, or parking movement of the vehicle 10 is stopped. Therefore, the display control unit 56 determines, for example, whether the end button is tapped by the user, or whether the parking movement is stopped. Further, when a vehicle speed (movement speed) of the vehicle is a predetermined threshold or more, the display control unit 56 may hide the external environment recognition image. Accordingly, for example, when the driver of the vehicle 10 stops parking and the vehicle 10 returns to normal traveling, the external environment recognition image may also be hidden.

When the external environment recognition image is not hidden, for example, when the end button is not tapped in step S17 (step S17: No), the display control unit 56 returns to step S13, and repeatedly executes the processing of each step.

When the external environment recognition image is hidden, for example, when the end button is tapped in step S17 (step S17: Yes), the display control unit 56 hides the external environment recognition image from the touch panel 42 (step S18), and ends the present display.

In step S16, the processing of superimposing, on the external environment recognition image, the stop guides in which the portions overlapping with the bumper in the external environment recognition image are hidden has been described, but as described above, the display control unit 56 may display the stop guides in which the transmittance of the portions overlapping with the bumper in the external environment recognition image is higher than the transmittance of other portions in a superimposed manner in the external environment recognition image.

(Guide Display by Display Control Unit 56)

Next, an example of the stop guides displayed on the touch panel 42 by the display control unit 56 will be described with reference to FIGS. 5 and 6.

(First Display Mode)

Figure 5:
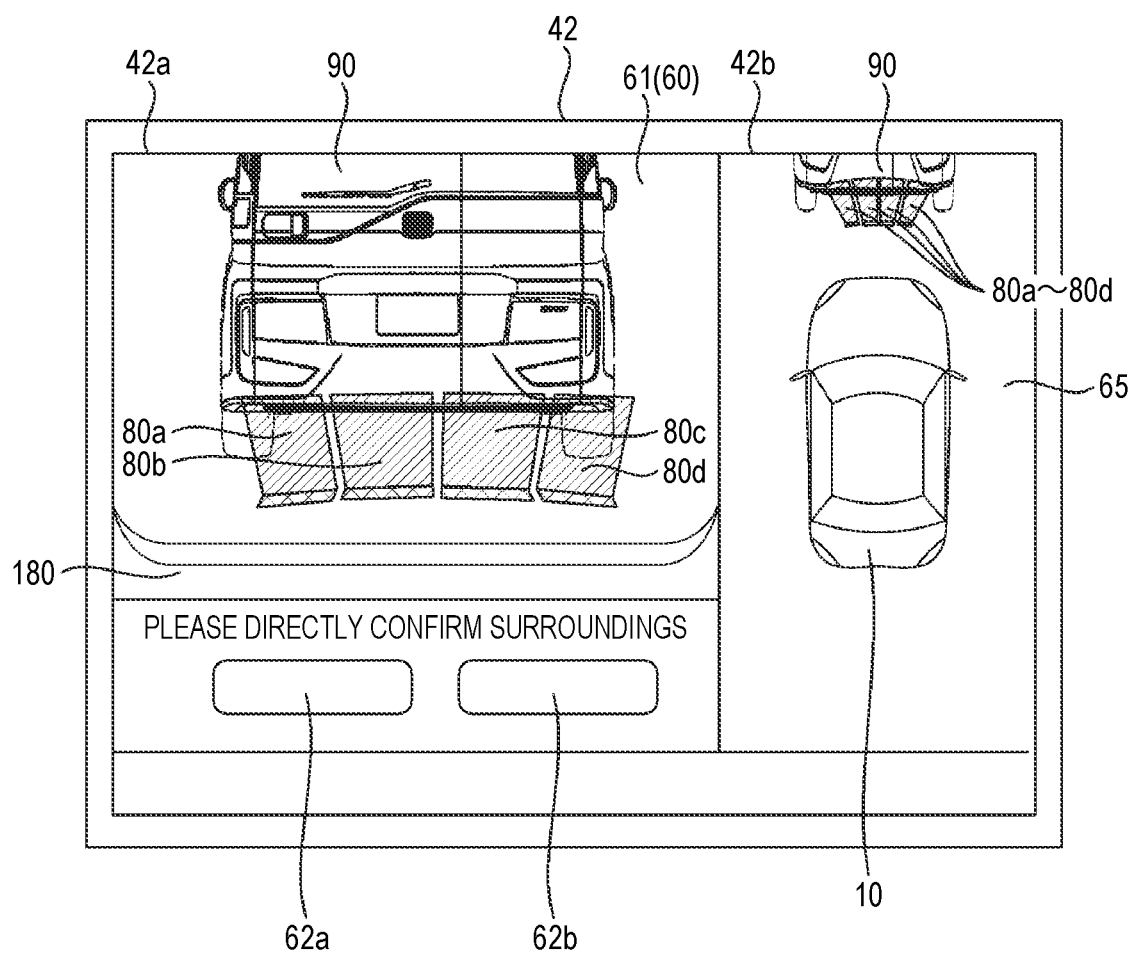
FIG. 5 is a diagram showing a first display mode of stop guides displayed in a superimposed manner on a front side recognition image 61 (external environment recognition image 60) and a top view image 65.

FIG. 5 is a diagram showing a first display mode of stop guides displayed in a superimposed manner on a front side recognition image 61 (external environment recognition image 60) and a top view image 65.

As shown in FIG. 5, the display control unit 56 generates, for example, a first display region 42a and a second display region 42b on the touch panel 42. The display control unit 56 displays the front side recognition image 61 captured by the front camera 12Fr in the first display region 42a. The front side recognition image 61 includes an image of another vehicle 90 that stops in front of the vehicle 10. Further, the display control unit 56 displays viewpoint switching buttons 62a and 62b that switch a type of the external environment recognition image 60 (the front side recognition image, the rear side recognition image, the left side recognition image, and the right side recognition image) displayed in the first display region 42a, for example, below the first display region 42a. The display control unit 56 displays, in the second display region 42b, the top view image 65 of the surroundings of the vehicle 10 generated based on captured images of the front camera 12Fr, the rear camera 12Rr, the left side camera 12L, and right side camera 12R.

As shown in FIG. 5, when a distance between the vehicle 10 and the other vehicle 90 approaches less than a certain distance, the display control unit 56 displays, for example, four stop guides 80a to 80d in a superimposed manner on the front side recognition image 61 and the top view image 65. The stop guides 80a to 80d are displayed correspondingly to a position of the other vehicle 90. As described above, the stop guides 80a to 80d are guides indicating that the vehicle 10 needs to be stopped, that is, guides warning that the vehicle 10 approaches an obstacle, and are displayed like four longitudinal signboards arranged in parallel in a lateral direction.

A bumper 180 is the bumper (specific portion) of the vehicle 10 appearing in the front side recognition image 61. In a state shown in FIG. 5, a region of the bumper 180 in the front side recognition image 61 and regions of the stop guides 80a to 80d generated based on a distance between the vehicle 10 and the other vehicle 90 or the like do not overlap with each other. Therefore, the display control unit 56 superimposes all the stop guides 80a to 80d on the front side recognition image 61, and displays them in the first display region 42a.

(Second Display Mode)

Figure 6:
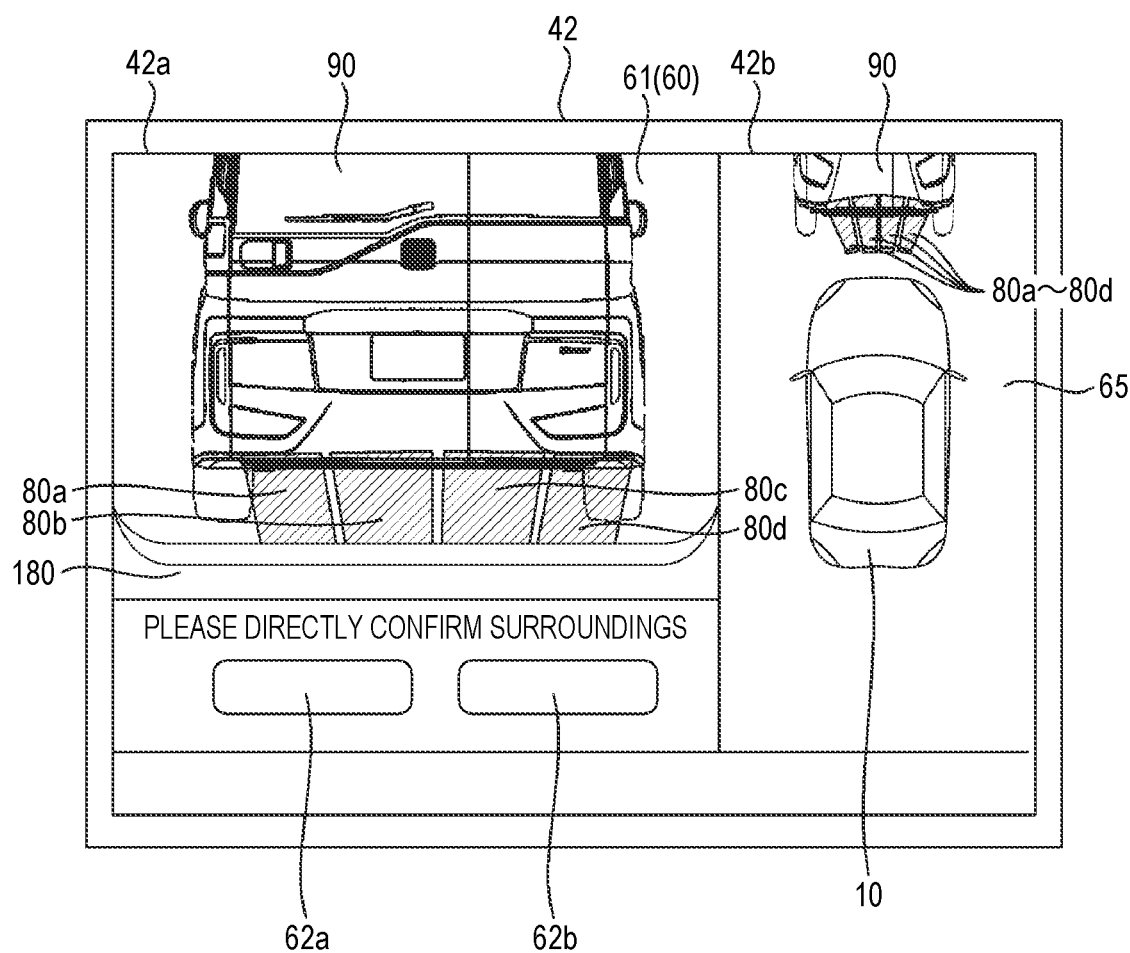
FIG. 6 is a diagram showing a second display mode of the stop guides displayed in a superimposed manner on the front side recognition image 61 (external environment recognition image 60) and the top view image 65.

FIG. 6 is a diagram showing a second display mode of the stop guides displayed in a superimposed manner on the front side recognition image 61 (external environment recognition image 60) and the top view image 65.

In a state shown in FIG. 6, the vehicle 10 and the other vehicle 90 further come closer to each other from the state shown in FIG. 5, and the regions of the stop guides 80a to 80d generated based on the distance between the vehicle 10 and the other vehicle 90 or the like are regions that can be seen on a nearer side than those in the state shown in FIG. 5. As a result, the region of the bumper 180 in the front side recognition image 61 and the regions of the stop guides 80a to 80d generated based on the distance between the vehicle 10 and the other vehicle 90 or the like overlap with each other.

Therefore, the display control unit 56 superimposes the stop guides 80a to 80d on the front side recognition image 61 with regions of the stop guides 80a to 80d that overlap the region of the bumper 180 being hidden, and displays them in the first display region 42a. Accordingly, it is possible to prevent the driver from seeing that the stop guides 80a to 80d are on the nearer side of the bumper 180. Therefore, it is possible to prevent a grasp of the distance from the other vehicle 90 (obstacle) by the driver from becoming difficult.

As described above, when the stop guides 80*a* to 80*d* are superimposed on the front side recognition image 61 (external environment recognition image 60), the display control unit 56 of the calculation unit 52 makes the display modes of the stop guides 80*a* to 80*d* different according to whether the bumper 180 of the vehicle 10 included in the front side recognition image 61 and the stop guides 80*a* to 80*d* overlap with each other. Specifically, when the bumper 180 included in the front side recognition image 61 and the stop guides 80*a* to 80*d* overlap with each other, the display control unit 56 makes the display modes different between in the regions of the stop guides 80*a* to 80*d* that overlap with the bumper 180 and in other regions of the stop guides 80*a* to 80*d*.

Accordingly, it is possible to improve visibility of the stop guides 80*a* to 80*d* when the bumper 180 of the vehicle 10 included in the front side recognition image 61 and the stop guides 80*a* to 80*d* overlap with each other. Therefore, a distance to the position where the vehicle 10 needs to be stopped may be grasped, and safety of the vehicle 10 may be improved. Further, it is possible to accurately park the vehicle 10.

For example, when the bumper 180 included in the front side recognition image 61 and the stop guides 80*a* to 80*d* overlap with each other, the display control unit 56 hides or displays with relatively high transmittance the regions of the stop guides 80*a* to 80*d* that overlap the bumper 180. Accordingly, it is possible to prevent the driver from seeing that the stop guides 80*a* to 80*d* are on the nearer side of the bumper 180 of the vehicle 10, and to further improve the visibility of the stop guides 80*a* to 80*d* when the bumper 180 of the vehicle 10 included in the front side recognition image 61 and the stop guides 80*a* to 80*d* overlap with each other.

The transmittance of the regions of the stop guides 80*a* to 80*d* that overlap with the bumper 180 when the bumper 180 included in the front side recognition image 61 and the stop guides 80*a* to 80*d* overlap with each other may be selectable by the user (for example, the driver). Accordingly, even if appearances of the guides are different depending on the user (e.g. difficult to see, or easy to see), since the user may select the transmittance of the stop guides 80*a* to 80*d*, the visibility of the stop guides 80*a* to 80*d* may be improved, and it is possible to accurately park the vehicle 10.

The display control unit 56 displays the stop guides 80*a* to 80*d* in a superimposed manner on the front side recognition image 61 in response to approach between the other vehicle 90 (obstacle) and the host vehicle 10. Accordingly, it is possible to prevent a situation where the other vehicle 90 (obstacle) and the host vehicle 10 come into contact with each other in advance, and it is possible to accurately park the vehicle 10.

The embodiment of the present disclosure has been described above, but the present invention is not limited to the embodiment described above, and modifications, improvements, and the like may be made as appropriate.

For example, the display control unit 56 may superimpose moving guides indicating a predetermined position of the vehicle 10 in a traveling direction together with the stop guides (for example, the stop guides 80*a* to 80*d*) on the external environment recognition image (for example, the front side recognition image 61 or the top view image 65), and display the moving guides together with the stop guides on the touch panel 42. The moving guides are, for example, guides indicating a width of the vehicle 10 or a front end and a rear end of the vehicle 10. The moving guides are guides that are always displayed fixedly at a certain distance from the vehicle 10. A fixed position where the moving guides are displayed fixedly may be varied according to a travel speed of the vehicle 10. Specifically, as the travel speed is higher, the certain distance from the vehicle 10 may be set longer.

The processing when the stop guides are displayed in a superimposed manner on the front side recognition image 61 captured by the front camera 12Fr has been described, and the display control unit 56 may also execute similar processing when the stop guides are displayed in a superimposed manner on the rear side recognition image captured by the rear camera 12Rr.

The control method described in the embodiment described above may be implemented by executing a control program prepared in advance by a computer. The present control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. Corresponding constituent elements and the like in the embodiment described above are shown in parentheses, but the present invention is not limited thereto.

(1) A control device including:
an external environment recognition unit (an external environment recognition unit 55) configured to acquire an external environment recognition image (an external environment recognition image 60) showing a recognition result of surroundings of a moving body (a vehicle 10); and
a display control unit (a display control unit 56) configured to display the external environment recognition image on a display device (a touch panel 42), in which
the display control unit is configured to superimpose and display a stop guide (stop guides 80*a* to 80*d*) indicating a position where movement of the moving body needs to be stopped on the external environment recognition image on the display device, and,
when the stop guide is superimposed on the external environment recognition image, the display control unit makes a display mode of the stop guide different according to whether a specific portion of the moving body included in the external environment recognition image and the stop guide overlap with each other.

According to (1), it is possible to improve visibility of the stop guide when the specific portion of the moving body included in the external environment recognition image and the stop guide overlap with each other. Therefore, it is possible to grasp a distance to the position where the moving body needs to be stopped, and to improve safety of the moving body.

(2) The control device according to (1), in which,
when the specific portion included in the external environment recognition image and the stop guide overlap with each other, the display control unit makes the display mode different between in a region of the stop guide overlapping with the specific portion and in another region of the stop guide.

According to (2), it is possible to further improve visibility of the stop guide when the specific portion of the moving body included in the external environment recognition image and the stop guide overlap with each other by making the display mode of only the region of the stop guide overlapping with the specific portion of the moving body different.
(3) The control device according to (2), in which,
when the specific portion included in the external environment recognition image and the stop guide overlap with each other, the display control unit hides the region of the stop guide overlapping with the specific portion.

According to (3), it is possible to prevent the driver from seeing that the stop guide is on a nearer side of the specific portion of the moving body, and to further improve the visibility of the stop guide when the specific portion of the moving body included in the external environment recognition image and the stop guide overlap with each other.

(4) The control device according to (2), in which,
when the specific portion included in the external environment recognition image and the stop guide overlap with each other, the display control unit makes transmittance of the region of the stop guide overlapping with the specific portion higher than transmittance of the other region of the stop guide.

According to (4), it is possible to prevent the driver from seeing that the stop guide is on the nearer side of the specific portion of the moving body, and to further improve the visibility of the stop guide when the specific portion of the moving body included in the external environment recognition image and the stop guide overlap with each other.

(5) The control device according to (4), in which
the transmittance of the region of the stop guide overlapping with the specific portion when the specific portion included in the external environment recognition image and the stop guide overlap with each other is selectable by a user.

According to (5), it is possible to flexibly select the display mode of the stop guide when the specific portion of the moving body included in the external environment recognition image and the stop guide overlap with each other.

(6) The control device according to any one of (1) to (5), further including:
an obstacle recognition unit configured to recognize an obstacle around the moving body, in which
the display control unit superimposes the stop guide on the external environment recognition image in response to approach between the obstacle and the moving body.

According to (6), it is possible to prevent a situation where the obstacle and the moving body come into contact with each other in advance, and to improve the safety of the moving body.

(7) A control method by a control device including an external environment recognition unit configured to acquire an external environment recognition image showing a recognition result of surroundings of a moving body and configured to display the external environment recognition image on a display device, the control method including:
superimposing and displaying a stop guide showing a position where movement of the moving body needs to be stopped on the external environment recognition image on the display device; and
making a display mode of the stop guide different according to whether a specific portion of the moving body included in the external environment recognition image and the stop guide overlap with each other when the stop guide is superimposed on the external environment recognition image.

According to (7), it is possible to improve the visibility of the stop guide when the specific portion of the moving body included in the external environment recognition image and the stop guide overlap with each other. Therefore, it is possible to grasp a distance to the position where the moving body needs to be stopped, and to improve safety of the moving body.

(8) A non-transitory computer readable storage medium storing a control program for causing a processor of a control device including an external environment recognition unit configured to acquire an external environment recognition image showing a recognition result of surroundings of a moving body and configured to display the external environment recognition image on a display device to execute a process including:
superimposing and displaying a stop guide indicating a position where movement of the moving body needs to be stopped on the external environment recognition image on the display device, and
making a display mode of the stop guide different according to whether a specific portion of the moving body included in the external environment recognition image and the stop guide overlap with each other when the stop guide is superimposed on the external environment recognition image.

According to (8), it is possible to improve the visibility of the stop guide when the specific portion of the moving body included in the external environment recognition image and the stop guide overlap with each other. Therefore, it is possible to grasp a distance to the position where the moving body needs to be stopped, and to improve safety of the moving body.

What is claimed is:
1. A control device comprising:
a camera included in a moving body and configured to acquire an external environment recognition image showing a recognition result of surroundings of the moving body, a field of view of the camera including a specific portion of the moving body; and
a display control unit configured to display the external environment recognition image on a display device, wherein
the external environment recognition image includes the specific portion,
the display control unit is configured to superimpose and display a stop guide indicating a position where movement of the moving body needs to be stopped on the external environment recognition image on the display device,
when the stop guide is superimposed on the external environment recognition image, the display control unit makes a display mode of the stop guide different according to whether the specific portion included in the external environment recognition image and the stop guide overlap with each other,
when the specific portion included in the external environment recognition image and the stop guide overlap with each other, the display control unit
hides a region of the stop guide overlapping with the specific portion, or
makes transmittance of the region of the stop guide overlapping with the specific portion higher than transmittance of an other region of the stop guide, and
the display control unit is implemented via at least one processor.

2. The control device according to claim 1, wherein the transmittance of the region of the stop guide overlapping with the specific portion when the specific portion included in the external environment recognition image and the stop guide overlap with each other is selectable by a user.

3. The control device according to claim 2, further comprising:
an obstacle recognition unit configured to recognize an obstacle around the moving body, wherein
the display control unit superimposes the stop guide on the external environment recognition image in response to approach between the obstacle and the moving body, and
the obstacle recognition unit is implemented via at least one processor.

4. The control device according to claim 1, further comprising:
an obstacle recognition unit configured to recognize an obstacle around the moving body, wherein
the display control unit superimposes the stop guide on the external environment recognition image in response to approach between the obstacle and the moving body, and
the obstacle recognition unit is implemented via at least one processor.

5. The control device according to claim 1, further comprising:
an obstacle recognition unit configured to recognize an obstacle around the moving body, wherein
the display control unit superimposes the stop guide on the external environment recognition image in response to approach between the obstacle and the moving body, and
the obstacle recognition unit is implemented via at least one processor.

6. The control device according to claim 1, wherein the moving body is a vehicle and the specific portion is a bumper of the vehicle.

7. The control device according to claim 1, wherein the camera is a front camera or a rear camera.

8. A control method by a control device including a camera included in a moving body and configured to acquire an external environment recognition image showing a recognition result of surroundings of the moving body, a field of view of the camera including a specific portion of the moving body, the control method comprising:
displaying the external environment recognition image on a display device, the the external environment recognition image includes the specific portion;
superimposing and displaying a stop guide showing a position where movement of the moving body needs to be stopped on the external environment recognition image on the display device;
making a display mode of the stop guide different according to whether a specific portion of the moving body included in the external environment recognition image and the stop guide overlap with each other when the stop guide is superimposed on the external environment recognition image; and
when the specific portion included in the external environment recognition image and the stop guide overlap with each other
hiding a region of the stop guide overlapping with the specific portion, or
making transmittance of the region of the stop guide overlapping with the specific portion higher than transmittance of an other region of the stop guide.

9. A non-transitory computer readable storage medium storing a control program, which when executed by a processor of a control device causes the processor to execute a control method, the control device including a camera included in a moving body and configured to acquire an external environment recognition image showing a recognition result of surroundings of the moving body, a field of view of the camera including a specific portion of the moving body, the control method comprising:
displaying the external environment recognition image on a display device, the external environment recognition image includes the specific portion;
superimposing and displaying a stop guide indicating a position where movement of the moving body needs to be stopped on the external environment recognition image on the display device;
making a display mode of the stop guide different according to whether a specific portion of the moving body included in the external environment recognition image and the stop guide overlap with each other when the stop guide is superimposed on the external environment recognition image; and
when the specific portion included in the external environment recognition image and the stop guide overlap with each other
hiding a region of the stop guide overlapping with the specific portion, or
making transmittance of the region of the stop guide overlapping with the specific portion higher than transmittance of an other region of the stop guide.

* * * * *